(12) United States Patent
Mawby

(10) Patent No.: US 9,937,677 B2
(45) Date of Patent: Apr. 10, 2018

(54) UNIFORMITY IMPROVEMENT THROUGH DISCRETE EFFECT IDENTIFICATION

(75) Inventor: William David Mawby, Simpsonville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 621 days.

(21) Appl. No.: 14/390,597

(22) PCT Filed: Apr. 19, 2012

(86) PCT No.: PCT/US2012/034219
§ 371 (c)(1),
(2), (4) Date: Oct. 3, 2014

(87) PCT Pub. No.: WO2013/158102
PCT Pub. Date: Oct. 24, 2013

(65) Prior Publication Data
US 2015/0165705 A1    Jun. 18, 2015

(51) Int. Cl.
*B29D 30/00*     (2006.01)
*B29D 30/30*     (2006.01)
*G01M 17/02*     (2006.01)

(52) U.S. Cl.
CPC ......... *B29D 30/0061* (2013.01); *B29D 30/00* (2013.01); *B29D 30/30* (2013.01);
(Continued)

(58) Field of Classification Search
CPC .... B29D 30/00; B29D 30/30; B29D 30/0061; B29D 2030/0066; B29D 2030/3064; B29D 2030/3085; G01M 17/02
See application file for complete search history.

(56) References Cited

U.S. PATENT DOCUMENTS

| 4,805,125 A | 2/1989 | Beebe |
| 5,186,773 A | 2/1993 | Oku |

(Continued)

FOREIGN PATENT DOCUMENTS

| WO | WO 2010126516 | 11/2010 |
| WO | WO 2010127061 | 11/2010 |

(Continued)

OTHER PUBLICATIONS

PCT International Search Report for PCT/US2012/034219, dated Jul. 17, 2012.

*Primary Examiner* — Bryan Bui
(74) *Attorney, Agent, or Firm* — Dority & Manning, P.A.

(57) ABSTRACT

Systems and methods for improving the uniformity of a tire by separating uniformity contributions associated discrete effects, such as effects resulting from product joints, from continuous effects are provided. For instance, uniformity contributions associated with the product joints are determined by analyzing a uniformity waveform to process the uniformity waveform into one or more continuous components and at least one joint component. Knowledge of the uniformity contributions associated with product joints in the tire can be used, for instance, to make structural improvements in the manufacture of the tire, to actively manage the joint-making process, and to perform dynamic correction of joint effects.

9 Claims, 10 Drawing Sheets

(52) U.S. Cl.
CPC ..... *G01M 17/02* (2013.01); *B29D 2030/0066* (2013.01); *B29D 2030/3064* (2013.01); *B29D 2030/3085* (2013.01)

(56) References Cited

U.S. PATENT DOCUMENTS

| | | | |
|---|---|---|---|
| 6,514,441 | B1 | 2/2003 | Tanaka et al. |
| 6,856,929 | B1 | 2/2005 | Mawby et al. |
| 9,778,032 | B2 * | 10/2017 | Flament ................. G01B 21/20 |
| 2003/0149542 | A1 | 8/2003 | Chang |
| 2004/0238986 | A1 | 12/2004 | Kobayashi |
| 2005/0142238 | A1 | 6/2005 | Tsujimoto et al. |
| 2006/0137802 | A1 | 6/2006 | Flament et al. |
| 2007/0023122 | A1 | 2/2007 | Moriguchi et al. |
| 2007/0137764 | A1 | 6/2007 | Sawada et al. |
| 2007/0145623 | A1 | 6/2007 | Hair |
| 2012/0035757 | A1 | 2/2012 | Mawby et al. |
| 2014/0338437 | A1 * | 11/2014 | Mawby .............. B29D 30/0633 73/146 |
| 2015/0165705 | A1 | 6/2015 | Mawby |

FOREIGN PATENT DOCUMENTS

| | | |
|---|---|---|
| WO | WO 2012126498 | 11/2010 |
| WO | WO 201200302 | 1/2012 |
| WO | WO 2012002949 | 1/2012 |

\* cited by examiner

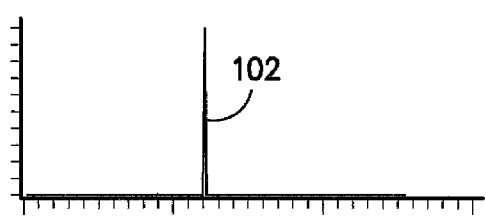
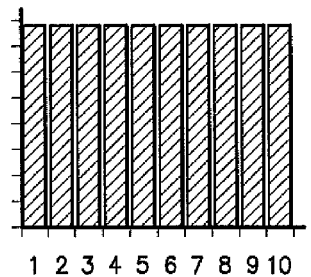
FIG. 2(a)　　　　　　FIG. 2(b)
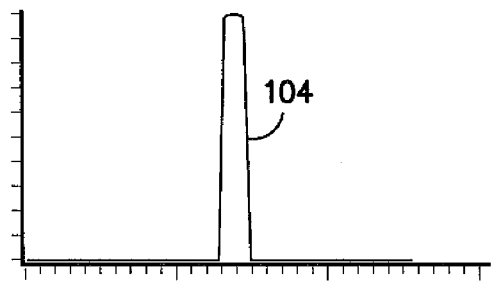
FIG. 3(a)
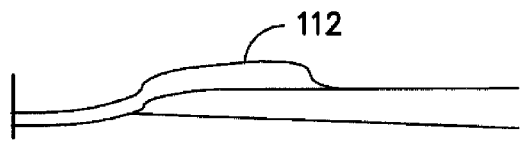
FIG. 3(b)

UNIFORMITY IMPROVEMENT THROUGH DISCRETE EFFECT IDENTIFICATION

FIELD OF THE INVENTION

The present disclosure relates generally to systems and methods for improving tire uniformity, and more particularly to systems and methods for separating discrete effects, such as effects resulting from product joints, from continuous cyclic effects to obtain uniformity improvement.

BACKGROUND OF THE INVENTION

Tire non-uniformity relates to the symmetry (or lack of symmetry) relative to the tire's axis of rotation in certain quantifiable characteristics of a tire. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity characteristics, or attributes, are generally categorized as dimensional or geometric variations (radial run out (RRO) and lateral run out (LRO)), mass variance, and rolling force variations (radial force variation, lateral force variation and tangential force variation, sometimes also called longitudinal or fore and aft force variation). Uniformity measurement machines often measure the above and other uniformity characteristics by measuring force at a number of points around a tire as the tire is rotated about its axis.

Once tire uniformity characteristics are identified, correction procedures may be able to account for some of the uniformities by making adjustments to the manufacturing process. Additional correction procedures can be performed to address non-uniformities of a cured tire including, but not limited to, the addition and/or removal of material to a cured tire and/or deformation of a cured tire.

Many different factors can contribute to the presence of non-uniformities in tires, including the presence of one or more product joints in the tire. Product joints are typically formed in various products during the manufacture of the tire, such as the casing textile plies, the belt plies, bead rings, the inner liner, the tread, and other rubber layers. The geometry of the joint coupled with the physical action of making the joint can have a significant impact on the uniformity of a tire.

Current methods of uniformity analysis can inaccurately separate continuous cyclic uniformity effects from more discrete effects, such as effects resulting from product joints, leading to reduced effectiveness of uniformity correction processes. The inaccuracies can occur in large part because discrete effects resulting from product joints are local phenomena similar to square wave and are not pure sinusoids. Such a joint shape will, in general, contribute to multiple uniformity harmonics simultaneously. Thus, correction procedures designed to address a uniformity problem at one harmonic can result in deterioration of uniformity at other harmonics.

Thus, a need exists for a system and method to more accurately identify the impact of discrete effects, such as effects resulting from product joints, on the uniformity of a tire.

SUMMARY OF THE INVENTION

Aspects and advantages of the invention will be set forth in part in the following description, or may be obvious from the description, or may be learned through practice of the invention.

One exemplary aspect of the present disclosure is directed to a method for improving the uniformity of tires. The method can include receiving, at a processing device, a uniformity waveform measured for a tire. The uniformity waveform is associated with at least one uniformity parameter for the tire. The method further includes analyzing, with the processing device, the uniformity waveform to parse the uniformity waveform into one or more continuous components and at least one joint component. The at least one joint component is associated with a product joint in the tire. The method further includes deriving, with the processing device, one or more characteristics of the product joint based at least in part on the at least one joint component. In particular implementations, the one or more characteristics of the product joint can include a joint location, a joint height, a joint length, or a joint shape. The method can further include modifying manufacture of one or more tires based on the one or more characteristics of the product joint.

According to a particular aspect of the present disclosure, analyzing the uniformity waveform includes modeling the uniformity waveform as a sum of a plurality of sinusoid terms and at least one joint term. The plurality of sinusoid terms can be associated with the one or more continuous components and the at least one joint term can be associated with the joint component. Analyzing the waveform can further include estimating coefficients associated with the at least one joint term using a linear regression analysis or a linear programming analysis, and determining one or more characteristics of the product joint based at least in part on the determined coefficients.

Another exemplary aspect of the present disclosure is directed to a system for improving the uniformity of tires. The system includes a processor and a computer-readable medium storing computer readable instructions for execution by the processor. The computer-readable medium further stores a uniformity waveform for at least one measured uniformity parameter for a tire. The processor is configured to execute the computer-readable instructions to analyze the uniformity waveform to parse the uniformity waveform into one or more continuous components and at least one joint component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1(a) plots radial force along the abscissa and the azimuthal location along the tire along the ordinate.

FIG. 1(c) plots the relative contribution at each harmonic along the abscissa and the associated harmonic along the ordinate.

FIG. 2(a) depicts a uniformity waveform for an exemplary point joint. FIG. 2(a) plots radial force along the abscissa and the azimuthal location along the tire along the ordinate.

FIG. 2(b) depicts a histogram of the harmonic distribution associated with uniformity waveform of FIG. 2(a). FIG. 2(b) plots the relative contribution at each harmonic along the abscissa and the associated harmonic along the ordinate.

FIG. 3(a) depicts a uniformity waveform for an exemplary product joint. FIG. 3(a) plots radial force along the abscissa and the azimuthal location along the tire along the ordinate.

FIGS. 3(b) and 3(c) depict exemplary product joints that can be associated with the uniformity waveform of FIG. 3(a).

FIG. 3(d) plots the relative contribution at each harmonic along the abscissa and the associated harmonic along the ordinate.

FIG. 4(a) plots radial force along the abscissa and the azimuthal location along the tire along the ordinate.

FIG. 4(b) plots the relative contribution at each harmonic along the abscissa and the associated harmonic along the ordinate.

FIG. 5(a) plots radial force along the abscissa and the azimuthal location along the tire along the ordinate.

FIG. 5(b) plots radial force along the abscissa and the azimuthal location along the tire along the ordinate.

FIG. 5(c) plots radial force along the abscissa and the azimuthal location along the tire along the ordinate.

FIG. 9 plots radial force along the abscissa and the azimuthal location along the tire along the ordinate.

FIG. 10 plots percentage of product joints along the abscissa and joint height along the ordinate.

FIG. 11 plots percentage of product joints along the abscissa and percentage contribution to radial force variation at the first harmonic along the ordinate.

DETAILED DESCRIPTION OF THE PREFERRED EMBODIMENTS

Figure 1A:
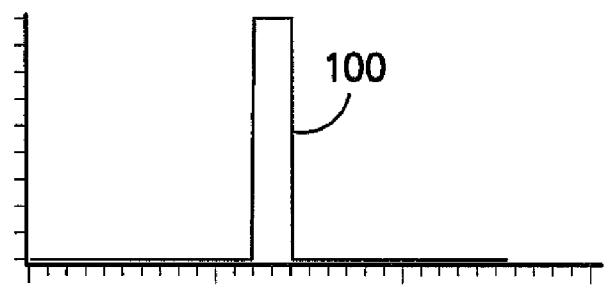
FIG. 1(a) depicts a uniformity waveform for an exemplary product joint.

It is to be understood by one of ordinary skill in the art that the present discussion is a description of exemplary embodiments only, and is not intended as limiting the broader aspects of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for improving the uniformity of a tire by separating uniformity contributions associated with discrete effects from uniformity contributions associated with continuous effects. Uniformity parameters such as radial run out (RRO) and radial force variation (RFV) are affected by both discrete effects and continuous effects. Discrete effects refer to effects occurring within discrete localized azimuthal locations of a tire, such as effects resulting from product joints in product layers that occur in tire manufacture, pinched rubber effects, heating spot effects, and other localized effects. Continuous effects refer to effects associated substantially across a tire circumference, such as effects resulting from variations in the shape of a product layer of a tire, such as out of roundness of the product layer on the building drum. Continuous effects can include contributions associated with cyclic variations that occur within the tire circumference (e.g. the out-of-roundness of the building drums, press effects, etc.) and/or contributions associated with cyclic variations having periods that are not integer divisors of the tire circumference (e.g. cyclic variation in tread thickness caused by an extruder control system or rollers which may deform the shape of softer products).

For illustrative purposes, the subject matter of the present disclosure will be discussed with reference to discrete effects resulting from product joints in various product layers in a tire. However, the teachings of the present disclosure can be applicable to other discrete effects, such as effects resulting from pinched rubber or other discrete localized effects. As discussed below, the impact of product joints on tire uniformity is different from that of continuous effects that can result in a pure harmonic effect or even a non-harmonic effect. Because the correction or prevention of uniformity problems typically has to be accomplished through changes to tire manufacture, it can be important to more clearly understand the effect on uniformity by separating the joint effects from the continuous effects. Knowledge of the uniformity contributions associated with product joints in the tire can be used, for instance, to make structural improvements in the manufacture of the tire, to actively manage the joint-making process, and to perform dynamic collection of joint effects to tires both before curing the tire and after curing the tire.

More particularly, a uniformity waveform associated with a uniformity parameter for a tire (such as a radial run out (RRO) waveform or a radial force variation (RFV) waveform) can be analyzed to parse the waveform into one or more continuous components and at least one joint component. For instance, the uniformity waveform can be modeled as a sum of sinusoid terms associated with the one or more continuous components and at least one joint term associated with the joint component. Linear regression or linear programming analysis can be performed to determine coefficients associated with the sinusoid terms and the at least one joint term. Joint characteristics, such as joint height, joint length, joint location, and joint shape, as well as their effect at various harmonics on the uniformity of the tire, can be determined from the coefficients.

Once constructed, the at least one joint term can be used in numerous ways to improve the uniformity of a tire. For instance, joint characteristics determined from coefficients associated with the joint term can be used to conduct joint audits to control the joint making process. In addition, the uniformity contribution of the product joint at various harmonics can be identified and this information can be used determine the best product joint characteristics for a particular tire.

The systems and methods of the present disclosure can be used to enhance existing uniformity improvement techniques. For instance, the systems and method of the present disclosure can be used to improve the manufacture of subsequent tires and/or to make real time improvements during the tire manufacturing process to improve before cure and/or after cure tire uniformity.

In one application, the separated joint effects can be used to improve a uniformity compensation method. For example, uniformity contributions resulting from various continuous effects and joint effects in the tire can be expressed in polar coordinates as vector representations of the various effects. The vector representations can have magnitudes equal to the peak-to-peak magnitude of the uniformity contribution at a particular harmonic and an azimuth equal to the angular difference between a measuring reference point and the point of the maximum uniformity contribution. The total uniformity contribution at a particular harmonic can be modeled as a vector sum of each of the vectors representing uniformity contributions from both joint effects and continuous effects. Because the subject matter of the present disclosure separates joint effects from continuous effects, the number of vectors used in such uniformity compensation analysis can be effectively doubled, leading to increased ability to improve the uniformity of a tire.

Studies have shown that separation of the joint effects from continuous effects can provide capability for substantial improvement on the uniformity of a tire. For instance, it has been found that potential improvement for separating joint effects from continuous effects can be on the order of 20% to 40% for the first four harmonics of radial force variation (RFV) when compared to existing tire uniformity compensation methods.

Figure 1B:
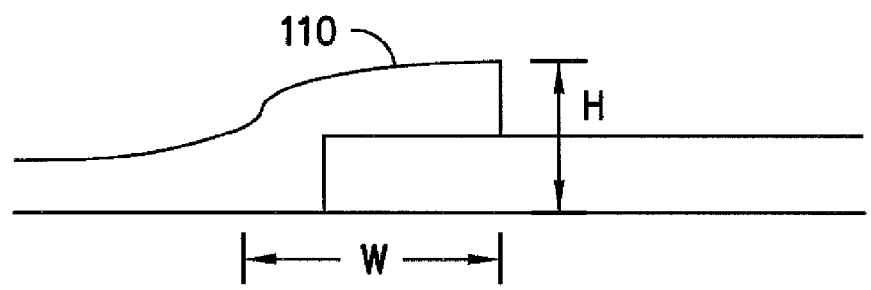
FIG. 1(b) depicts an exemplary product joint associated with the uniformity waveform in FIG. 1(a).
Figure 1C:
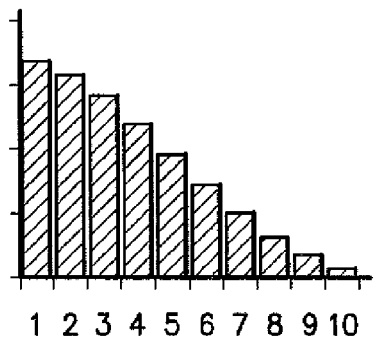
FIG. 1(c) depicts a histogram of the harmonic distribution associated with uniformity waveform of FIG. 1(a).

FIG. 1(a) depicts an RFV waveform 100 associated with a single rectangular product joint that is thicker than the rest of the tire. The RFV waveform can be associated with an overlap joint, such as the product joint 110 having a height H and a width W depicted in FIG. 1(b). The extra thickness associated with the height H of the product joint 110 will have a particular effect on the Fourier decomposition of the RFV waveform 100 into harmonics. FIG. 1(c) provides a histogram of the harmonic contribution of the rectangular product joint 110. As shown, the contribution of the rectangular product joint 110 is not contained in one harmonic, such as the first harmonic, but is equally spread over several harmonics with its effect diminishing into the higher harmonics.

The joint height H of the product joint 110 determines the amount of magnitude that is contributed to each harmonic and the joint width W of the product joint 110 affects the relative sizes of the contributions to each harmonic. The joint location on the tire is directly related to the azimuthal angle associated with peak contribution at each harmonic as well. Because a product joint affects multiple harmonics, it is possible that one physical product joint can potentially lead to problems at more than one harmonic. In addition, it will not be possible to alter a product joint without affecting multiple harmonics.

The shape of the product joint also affects the partitioning of the joint effect among the various harmonics. FIG. 2(a) illustrates an RFV waveform 102 associated with a very narrow joint or a point joint. For instance, the RFV waveform 102 of FIG. 2(a) can be associated with a product joint similar to the product joint 110 of FIG. 1(b), except with a width W approaching zero. As shown in FIG. 2(b), the effect of the joint is equally partitioned among all of the harmonics.

Figure 3C:
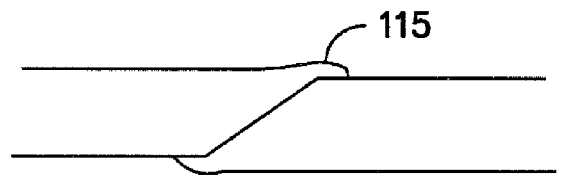
Figure 3D:
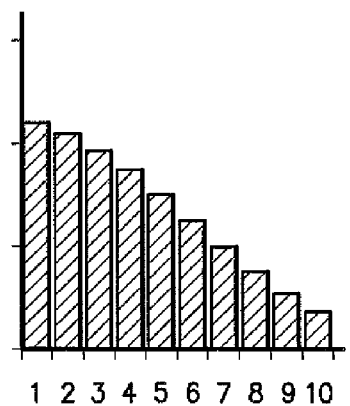
FIG. 3(d) depicts a histogram of the harmonic distribution associated with uniformity waveform of FIG. 3(a).

An RFV waveform 103 associated with a U-shaped product joint is depicted in FIG. 3(a). The joint associated with the RFV waveform 104 of FIG. 3(a) has a finite W width and more rounded sides. For instance, the joint associated with waveform 104 of FIG. 3(a) can be associated with the product joint 112 depicted in FIG. 3(b) or the product joint 115 depicted in FIG. 3(c). As shown, the product joints 112 and 115 have more rounded sides when compared to the product joint 110 of FIG. 1(b). The rounded sides can result from the manufacturing process of the tire, such as from a joint press or stretching of the product layer. The harmonic content of a U-shaped joint is illustrated in FIG. 3(d). As shown, the harmonic content of the U-shaped joint is intermediate between the point joint and the rectangular joint. Even the U-shaped joint does not produce a single harmonic impact, but rather affects uniformity across a plurality of harmonics.

Figure 4A:
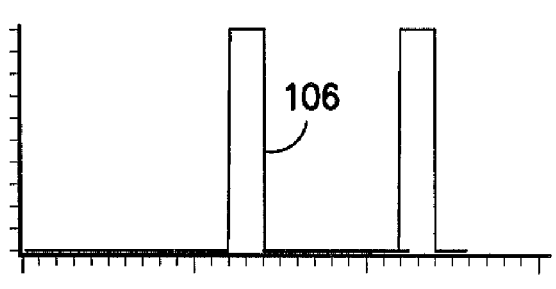
FIG. 4(a) depicts a uniformity waveform for multiple product joints.
Figure 4B:
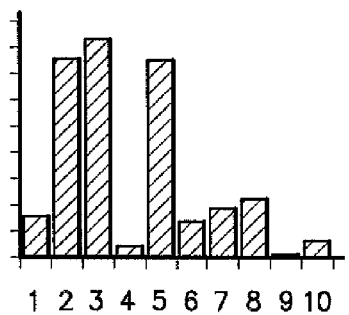
FIG. 4(b) depicts a histogram of the harmonic distribution associated with uniformity waveform of FIG. 4(a).

The effect of multiple joints can combine to create a variety of harmonic patterns, depending on the locations of the product joint. FIG. 4(a) depicts an RFV waveform 106 associated with multiple product joints with each joint being located at a different azimuthal location on the tire. FIG. 4(b) provides the harmonic distribution of the RFV waveform 104 shown in FIG. 4(a). Basically, the joints act as generators of harmonics at many levels which then interact constructively and destructively with each other as normal cyclical harmonics would. The harmonic contributions of each joint can cancel or reinforce one another depending on the relative positions of each joint.

Purely cyclic continuous effects, such as effects resulting from out-of-roundness of the tire building drum, press effects, effects within the product layer, or other effects, are different from joint effects in that purely cyclic continuous effects typically only register in one harmonic. In addition, multiple cyclic continuous inputs can combine in a much simpler manner than the case with multiple product joints. Indeed, multiple cyclic continuous effects for each frequency can be easily transformed into an equivalent single cyclic continuous effect that can be studied in its own right.

Figure 5A:
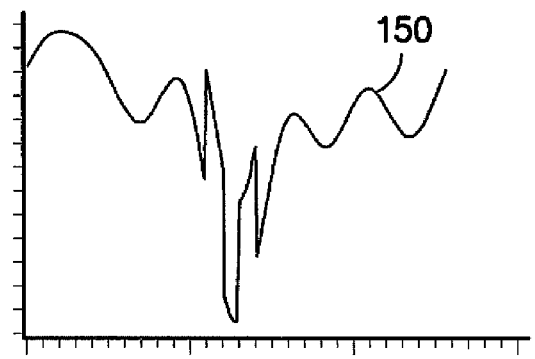
FIG. 5(a) depicts an exemplary uniformity waveform representative of a waveform measured for an actual tire according to an exemplary embodiment of the present disclosure.
Figure 5B:
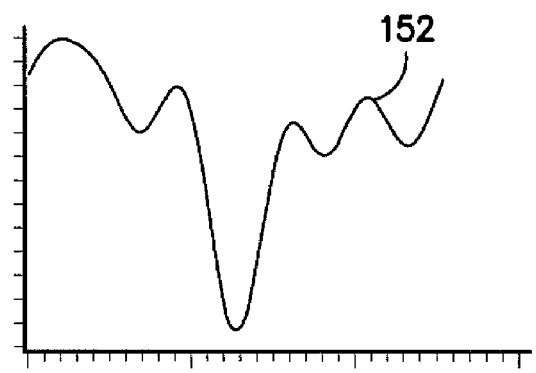
FIG. 5(b) depicts the continuous effect contribution to the uniformity waveform of FIG. 5(a).
Figure 5C:
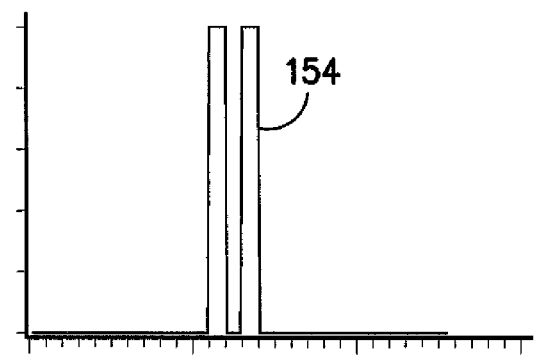
FIG. 5(c) depicts the joint effect contribution to the uniformity waveform of FIG. 5(a).

In practical applications, a uniformity waveform, such as a RRO waveform or RFV waveform, will be a mixture of both continuous effect and joint effects. FIG. 5(a) depicts an exemplary RFV waveform 150 that is more representative of an RFV waveform measured for an actual tire. The exemplary waveform 150 includes continuous effects at the first five harmonics as well as two joint effects. FIG. 5(b) depicts the continuous effect contribution 152 to the waveform 150. FIG. 5(c) depicts the joint effect contribution 154 to the waveform.

Separation of the uniformity waveform 150 into two or more input types, such as one or more continuous components associated with the continuous effects and one or more joint components associated with the joint effects, can provide many advantages in a uniformity analysis. Once the separate components have been identified, actions can be taken in a more efficient manner to control the largest contributing component. As demonstrated, the effects of product joints can be quite different than the continuous effects on uniformity. Separation of joint effects from continuous effects make it possible to target improvement of the product joints and/or to rotate the azimuthal location of the product joints about the tire to improve uniformity. For example, a product joint could be rotated about the azimuth of the tire to better compensate other joint effects in addition to compensating for continuous effects.

Figure 6:
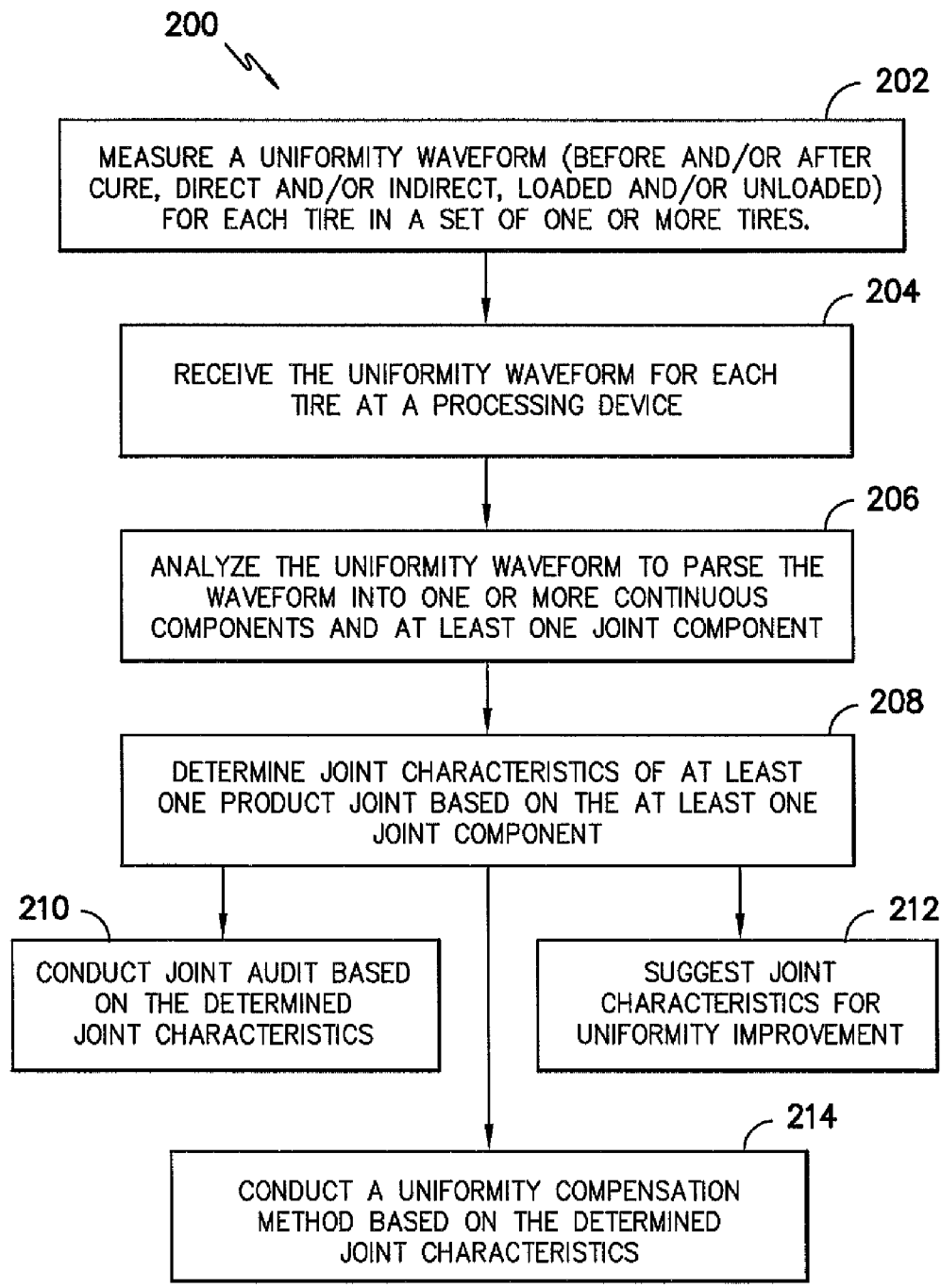
FIG. 6 depicts a flow diagram of an exemplary method according to an exemplary embodiment of the present disclosure.

FIG. 6 depicts an exemplary flow diagram of a method (200) for improving the uniformity of a tire by separating continuous components from one or more joint components according to an exemplary aspect of the present disclosure. At (202), the method includes measuring a uniformity waveform for a tire. The uniformity waveform can be for a single tire or a plurality of tires from a common process or time period.

The uniformity waveform can be associated with at least one uniformity parameter for a tire. For instance, the uniformity waveform can correspond to uniformity parameters such as radial run out (RRO), radial force variation (REV), lateral run out (LRO), lateral force variation (LFV), balance, tangential force variation (TFV) or other suitable parameter. FIG. 5(a) depicts an exemplary RFV waveform that is representative of an RFV waveform measured for an actual tire. The present disclosure will be discussed with reference to an RFV waveform for exemplary purposes. Those of ordinary skill in the art, using the disclosures provided herein, should understand that the scope of the present disclosure is equally applicable to uniformity waveforms associated with other uniformity parameters.

The measured uniformity parameter often corresponds to a waveform constructed from a number of data points measured at equally spaced angular locations during one rotation of a tire (e.g. 128, 25, 512, or other suitable number of data points). For instance, a measured uniformity parameter (U) can be obtained at a plurality of equally spaced data points N around a tire such that measurements are obtained at data points $U_n$, for n=1, 2, ..., N.

It should be appreciated that the uniformity waveform can be obtained under a variety of conditions. For instance, the uniformity waveform can be measured before cure (e.g. an RRO waveform) or after cure (e.g. an RFV waveform) of a tire. A uniformity waveform obtained after cure of the tire will be referred to as an after cure uniformity waveform. A uniformity waveform obtained before cure of the tire will be referred to as a before cure uniformity waveform. The uniformity waveform can be obtained for rotation of the tire in either direction (direct and/or indirect). In addition, the uniformity waveform can be obtained under loaded or unloaded conditions.

It should also be appreciated that the actual data points $U_n$ of the uniformity waveform may be conditioned in accordance with a variety of known techniques. For instance, the $U_n$ values may be obtained at more than just a single rotation of a tire by averaging the obtained values at each data point during multiple rotations of the tire. In another example, the $U_n$ values may be conditioned by subtracting out the average magnitude value of the measured uniformity parameter across all respective data points such that the composite data waveform is centered around an origin of reference.

Referring to FIG. 6 at (204), the method includes receiving the uniformity waveform at a processing device, such as the processor of a computing device. The processing device can be configured to perform the exemplary analysis techniques discussed herein to parse the waveform into one or more continuous components and at least one joint component. An exemplary processing device will be discussed with reference to FIG. 8 below. The uniformity waveform can be received from any suitable device or component across any suitable interface. For example, the uniformity waveform can be received from a uniformity measurement machine at a computing device across a network.

Referring to FIG. 6 at (206), the method includes analyzing the uniformity waveform to parse the waveform into one or more continuous components and at least one joint component. As used herein, parsing the waveform into one or more continuous components and at least one joint component involves breaking down the uniformity waveform into one or more continuous components and at least one joint component. A typical analysis of a uniformity waveform involves breaking down the waveform into a sum of one or more sinusoid terms and solving for coefficients associated with the sinusoid terms. Entering just sinusoid terms into the uniformity waveform analysis, as is known in the art, simply reproduces a Fourier analysis of the uniformity waveform and does not separate the uniformity waveform into one or more continuous components and at least one joint component.

To address this deficiency, aspects of the present disclosure involve introducing additional terms associated with the joint effects as inputs in the uniformity waveform analysis. Coefficients can be solved for these additional terms and used to determine joint characteristics. Joint effect estimation can be done with no prior information about the joint location in a blind search analysis. However, the methods for separating joint effects from continuous effects discussed herein will be discussed with reference to applications in which information about the product joint, such as the relative joint location on the tire, is at least partially known.

Figure 7:
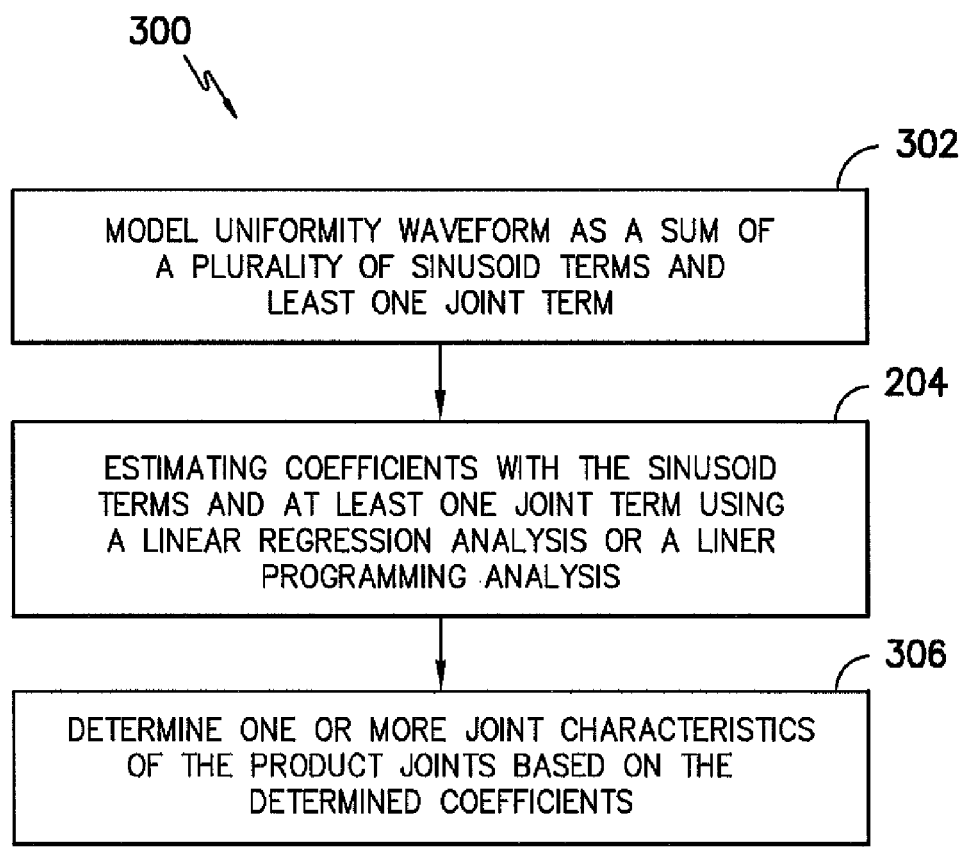
FIG. 7 depicts a flow diagram of an exemplary method according to an exemplary embodiment of the present disclosure.

FIG. 7 depicts a flow diagram of an exemplary method (300) for analyzing the waveform to parse the waveform into one or more continuous components and at least one joint component. At (302) the method includes modeling the uniformity waveform as a sum of a plurality of sinusoid terms and at least one joint term. The plurality of sinusoid terms are associated with the one or more continuous components of the uniformity waveform. The at least one joint term is associated with the at least one joint component of the uniformity waveform. At (304) the method includes estimating coefficients associated with the one or more sinusoid terms and the at least one joint term using a linear regression analysis or a linear programming analysis. Finally, at (306) the one or more joint characteristics based on the coefficients are determined.

For example in one embodiment, the uniformity waveform can be modeled as a sum of a set of J sinusoids, K joints, and random error as shown in the following equation (1):

$$U_n = \sum_{j=1}^{J}\sum_{n=1}^{N} x_j \cos\left(2\pi h_j \frac{n}{N}\right) + y_j \sin\left(2\pi h_j \frac{n}{N}\right) + \sum_{k=1}^{K} f_k(l_k < n < u_k) + \varepsilon_n \quad (1)$$

J is the total number of harmonics that are selected for analysis and can include tire harmonics (integer values of $h_j$) and process harmonics (non-integer values of $h_j$) for each of the jth harmonics. N is the length of the uniformity waveform, for n=1, 2, . . . , N data points measured around a tire. Coefficients associated with the sinusoid terms (the $$\cos\left(2\pi h_j \frac{n}{N}\right) \text{ and } \sin\left(2\pi h_j \frac{n}{N}\right)$$

terms) for each harmonic are provided by $x_j$ and $y_j$ respectively. $f_k$ represents any function of the waveform points associated with the joint within the joint interval $l_k$ to $u_k$ on the tire. $l_k$ represents the known relative starting location of a product joint and $u_k$ represents the known relative ending location of the product joint.

To facilitate estimation of the joint effects using the above model, it is possible to approximate or model the function $f_k$ for each joint term in several ways. In one example, the joint term is modeled as a unique joint term at every point within the joint interval $l_k$ to $u_k$. Each of these unique joint terms has an associated coefficient that is estimated in the uniformity analysis. In this example, the uniformity waveform can be modeled based on the following equation (2):

$$U_n = \sum_{j=1}^{J}\sum_{n=1}^{N} x_j \cos\left(2\pi h_j \frac{n}{N}\right) + y_j \sin\left(2\pi h_j \frac{n}{N}\right) + \sum_{k=1}^{K}\sum_{l_k}^{u_k} c_{kp}(p_k = n) + \varepsilon_n \quad (2)$$

where $c_{kp}$ is a separate coefficient for each point $p_k=n$ within the joint interval $l_k$ to $u_k$. This model provides the most flexible approximation and allows one to extract joint shape, length, and height simultaneously. This model also requires an increased number of coefficients ($2*J+(u_k-l_k+1)*K$) to be determined and can require increased computing/processing power and/or processing time.

In another example, the joint term can be modeled as a square wave within the joint interval $l_k$ to $u_k$. In this particular example, the uniformity waveform can be modeled based on the following equation (3):

$$U_n = \sum_{j=1}^{J}\sum_{n=1}^{N} x_j \cos\left(2\pi h_j \frac{n}{N}\right) + y_j \sin\left(2\pi h_j \frac{n}{N}\right) + \sum_{k=1}^{K}\sum_{l_k}^{u_k} c_{kp}(p_k = n) + \varepsilon_n \quad (3)$$

where $c_{kp}$ is subject to the constraint that $c_{kp}=0$ or $C_{kp}=C_k$. In this particular model, each point within the joint interval is modeled as a unique joint term having a coefficient of a fixed constant $c_k$ or 0. This model allows flexibility in determining joint characteristics such as joint length and joint height and should require fewer coefficients than the previous model. The joint height can be determined based on the value of the coefficient $c_k$. The joint length can be determined based on the number of points within the joint interval associated with a coefficient of $c_k$ as opposed to points associated with the coefficient 0.

In yet another example, both the joint length is known as well as the joint shape can be assumed to be known. In this example, the joint term can be modeled based on the following equation (4):

$$U_n = \sum_{j=1}^{J}\sum_{n=1}^{N} x_j \cos\left(2\pi h_j \frac{n}{N}\right) + y_j \sin\left(2\pi h_j \frac{n}{N}\right) + \sum_{k=1}^{K} c_k \, ind(l_k < n < u_k) + \varepsilon_n \quad (4)$$

In this example, the joint is modeled as a constant equal to a coefficient $c_k$ across the entire joint interval from $l_k$ to $u_k$. The indicator function $ind(l_k<n<u_k)$ provides a value of 1 for points within the joint interval $l_k$ to $u_k$ and 0 for points outside the joint interval $l_k$ to $u_k$. The joint height associated with the joint can be determined based on the single coefficient $c_k$. This model can have a fewer number of coefficients to be estimated when compared to the other models.

Other constraints can be added to the models to stabilize the estimation process. For instance, if there are many joints or closely spaced (in frequency) continuous components, then constraints such as maximum amplitudes can be included. In certain cases, it can be advantageous to constrain coefficients in the model to be greater than or equal to zero.

As discussed above, analyzing the uniformity waveform includes estimating coefficients for the one or more sinusoid terms and the at least one joint term as shown at (304) of FIG. 7. The coefficients associated with the sinusoid terms and the joint terms in the exemplary models provided in equations (1) through (4) can be estimated using a regression approach or a programming approach. Under a regression approach, coefficients are determined to best fit the equations to the data points in the uniformity waveform. For instance, the regression analysis will solve for the $x_j$, $y_j$ coefficients associated with the sinusoid terms and the $C_{kp}$ coefficients associated with the joint term such that the equation best fits the data provided by the uniformity waveform.

Under a programming approach, the coefficients are estimated to minimize the difference or error between the measured uniformity waveform data point and an estimated data point using a model. The coefficients can be estimated using a linear (or quadratic) programming approach. For instance, consider the example model associated with equation (4) where the joint term is modeled as a constant equal to a coefficient $c_k$ across the entire joint interval from $l_k$ to $u_k$. The coefficients can be estimated using a linear programming approach subject to the following constraints:

$$\min \sum_{n=1}^{N} |e_n|$$

where $$e_n = U_n - \left(\sum_{j=1}^{J}\sum_{n=1}^{N} x_j \cos\left(2\pi h_j \frac{n}{N}\right) + y_j \sin\left(2\pi h_j \frac{n}{N}\right) + \sum_{k=1}^{K} c_k(l_k < n < u_k)\right)$$

and $0<c_k$ for all k. One could also minimize the squared errors with the same formulation as well.

As another example, consider the model associated with equation (2) where the joint term is modeled as a plurality of points within the joint interval $l_k$ to $u_k$ with each point within the interval having a separate coefficient $c_{kp}$. The coefficients can be estimated using a linear programming approach subject to the following constraints:

$$\min \sum_{n=1}^{N} |e_n|$$

where $$e_n = U_n - \left( \sum_{j=1}^{J} \sum_{n=1}^{N} x_j \cos\left(2\pi h_j \frac{n}{N}\right) + y_j \sin\left(2\pi h_j \frac{n}{N}\right) + \sum_{k=1}^{K} \sum_{l_k}^{u_k} c_{kp}(p_k = n) \right)$$

and $0<c_k$ for all k. One could also minimize the squared errors with this formulation as well.

Referring back to FIG. 6 as (208), the method includes determining joint characteristics of at least one product joint based on the at least one joint component. The joint characteristics can include the joint height, joint length, and joint shape for a product joint associated with the joint term. According to a particular aspect of the present disclosure, various characteristics of a product joint can be derived based on the coefficients associated with the joint term as illustrated at (306) of FIG. 7.

Consider the example associated with equation (2) above which models the joint term as a plurality of points within a joint interval $l_k$ to $u_k$ with each point having a separate coefficient $c_{kp}$. This particular model provides flexibility in deriving joint characteristics including joint length, joint height, and joint shape. The joint length can be determined by identifying points within the joint interval $l_k$ to $u_k$ having coefficients indicating the start or end of a product joint. The joint height and joint shape can be determined from the values of the coefficients $c_{kp}$ across the joint interval.

As another example, consider the model associated with equation (3) above where the joint term is modeled as a square wave across the joint interval. This particular model provides flexibility in deriving joint characteristics including joint length and joint height. The joint length can be determined from the number of points within the joint interval $l_k$ to $u_k$ associated with the constant $c_k$ as opposed to the a zero value. The joint height can be determined from the value of the constant $c_k$.

As yet another example, consider the model associated with equation (4) above where the joint term is modeled as a constant $c_k$ across the entire joint interval $l_k$ to $u_k$. This particular model allows determination of joint height. The joint height can be determined based on the value of the coefficient $c_k$.

Referring still to FIG. 6 at (208), other joint characteristics can be determined from the joint component of the uniformity waveform. For instance, a Fourier analysis of just the joint term can be performed to identify the contribution of the product joint at various harmonics, such as at the first harmonic, second harmonic, etc. This information can be used as part of a uniformity analysis to improve the uniformity of the tire at selected harmonics as will be discussed in more detail below. For instance, the uniformity contribution of a product joint at a particular harmonic can be transformed into a vector representation that can be used to oppose other vectors to improve the uniformity of the tire at selected harmonics.

The derived joint characteristics can be used to modify manufacture of one or more tires to improve uniformity of the tire. There are a variety of ways of modifying manufacture of one or more tires based on the one or more characteristics of the product joint to improve uniformity of the tire. For example, the joint characteristics can be used as part of a joint audit, to change one or more joint characteristics in subsequently manufactured tires to improve uniformity of the subsequent tires, and as part of a uniformity compensation analysis to provide real time uniformity improvement of a tire either before curing of the tire or after curing of the tire.

For instance, as illustrated at (210) of FIG. 6, the joint characteristics of a tire can be used to conduct a joint audit of the tire. For example, the uniformity waveforms for a set of tires made under one process or by one operator can be analyzed using the disclosed methods to determine joint characteristics of the product joints used during manufacture of the tires. The joint characteristics can be compared to predetermined standards or within a study group or used in other ways to manage the joint making process in near real time. This can replace the typical joint audit that is done by a human operator whose time may be limited or is located far from the manufacturing site.

According to another aspect of the present disclosure, the determined joint characteristics can be used as part of the tire construction design process to change joint characteristics of a product joint of subsequently manufactured tires for uniformity improvement as shown at (212) of FIG. 6. As discussed above, the joint shape of a product joint can have a direct impact on the final uniformity of the tire for a given joint length and a joint height. Depending on other issues related to the construction of the tire, there may be a particular joint shape than can be chosen to provide the best uniformity characteristics of the tire. The analysis methods discussed herein can be used to identify a joint shape or other joint characteristics, such as joint height or joint length, to improve the uniformity provided by a particular tire design.

According to another aspect of the present disclosure, the joint characteristics can be used as part of uniformity compensation method to improve the uniformity of one or more tires as shown at (214). For instance, the joint characteristics can be used as part of a uniformity compensation method such as signature analysis, reduction of process harmonics (e.g. continuous harmonics with non-integer periods relative to tire circumference), or as part of a green tire correction system.

In an exemplary uniformity compensation method, the uniformity contributions at particular harmonics can be represented as vectors in polar coordinates with the magnitudes of the vectors equal to the peak-to-peak magnitude of the uniformity contribution at a particular harmonic and an azimuth equal to the angular difference between a measuring reference point and the point of the maximum uniformity contribution. The total uniformity contribution at a particular harmonic can be modeled as a vector sum of each of the vectors representing uniformity contributions from both joint effects and continuous effects. During the uniformity compensation method, vectors associated with certain uniformity contributions can be rotated to oppose vectors associated with other uniformity contributions, resulting in a reduced total uniformity contribution at a particular harmonic. An exemplary uniformity compensation analysis using vector representations of the uniformity contributions will be discussed with reference to FIGS. 12 and 13.

In one application, the uniformity compensation method serves as an extension of signature analysis to improve the uniformity of tires. In signature analysis, starting points of various tire products are staggered during the assembly process, followed by observing the effect on after cure uniformity, such as after cure radial force variation. The collected data is used to specify an arrangement of product start points for each of the tire building steps that best reduces after cure uniformity. For example, a product joint can be rotated to differing azimuthal locations on the building drum. If the product has a consistent signature (i.e. no process harmonic) then this rotation can be assumed to leave the magnitude of the joint effect intact and simply changes the azimuth associated with the effect by 180 degrees or other suitable rotation.

The rotation of the product joint can be represented in a vector analysis by rotating a vector representation of the joint effect. During the uniformity compensation method, vectors associated with certain uniformity contributions can be rotated to oppose vectors associated with other uniformity contributions, resulting in a reduced total uniformity contribution at a particular harmonic. The separation of uniformity contribution into joint effects and continuous effects provides for more vectors to rotate during the compensation analysis.

An important consideration in the application of the joint effect compensation in signature analysis is the fact that a product joint, because it is not a pure harmonic sinusoid, can have impacts on multiple tire harmonics. The rotation of a product joint with no change to the joint shape will, in general, rotate all of these harmonic effects simultaneously. Thus, the proper joint location can be used to selectively balance other sources of harmonic effects if necessary.

It is also possible to change the shape or length of the joint to change its relative contributions to different harmonics so that the compensation can be even more flexible. For example, a long product joint will have a stronger relative contribution to the lower harmonics (e.g. the first harmonic, the second harmonic, etc.) while a short joint will tend to impact the higher order harmonics more strongly. The shape of the joint also influences its effect although in a less sensitive way than either the length or the thickness. Even the number of joints can be used to gain an advantage in uniformity. For example, off-setting two joints by 180 degrees will, in general, reduce odd number harmonics (e.g. the first harmonic, the third harmonic, etc.) but increase even numbered harmonics (e.g. the second harmonic, the fourth harmonic, etc.). A short joint at 0 degrees and a long joint at 180 degrees could be used to decrease the impact at the first harmonic while allowing a small increase in the higher harmonics. Artificial joints can also be introduced, for instance, by purposely flattening of small areas via a joint press or other tool, to improve uniformity.

The uniformity compensation method can also be used in association with a green tire correction system. An exemplary green tire correction system is disclosed in WO2005/051640 which is incorporated herein by reference for all purposes. In one aspect, a before-cure uniformity waveform can be measured and analyzed to separate the uniformity waveform into joint components and continuous components. The joint components can be used to identify green joint characteristics which can then be used to modify the manufacture of the tire to improve the uniformity of the green tire. For instance, the uncured tire could be clamped and/or reshaped to compensate for one or more green joints in the green tire.

In other aspects, the green joint characteristics can be used to estimate an after-cure contribution of a product joint to tire uniformity. For instance, a set of waveforms that were made using random green product joints could be used to develop a model which can be used to estimate the effect of various green joint characteristics, such as joint height, joint length, and joint shape on after cure uniformity of a tire. One can then use the estimated after cure contribution of the product joint as part of a uniformity compensation analysis to improve uniformity of the tire. Manufacture of the tire can be modified to improve uniformity in accordance with the uniformity compensation analysis.

Determination of joint characteristics of a green product joint can open up potential in-line, tire-by-tire modifications to the tire manufacturing process. For example, the product joint itself can be modified to improve uniformity. In particular, the joint can be remade or reshaped to prevent the likelihood of an unacceptable final product. For instance a shaped joint press could exert differential pressure across the joint to change the shape of the joint from a square wave to more of a U-shaped joint.

As another example, an additional product joint can be altered to help correct a joint that is inaccessible to correction. For instance, a preparation joint in an underlying first product layer might prove impossible to change during tire building. To compensate for this, one might change the product joint in a second product layer to correct for the effects of the joint in the first product layer. This can be advantageous for at least the reason that the product joint associated with the first product layer can be inaccessible and because the product joint in the first product layer can have a worse impact on uniformity than the product joint in the second product layer.

As yet another example, artificial or "pseudo-joints" could be induced along a surface of a tire. For instance, the product joint associated with a tread layer in a tire can be known to be a primary contributor to poor uniformity on a particular tire. It could be advantageous to introduce "pseudo-joints" on the inside of the tread layer or on another interior product to counteract the effect of the product joint in the tread layer.

Figure 8:
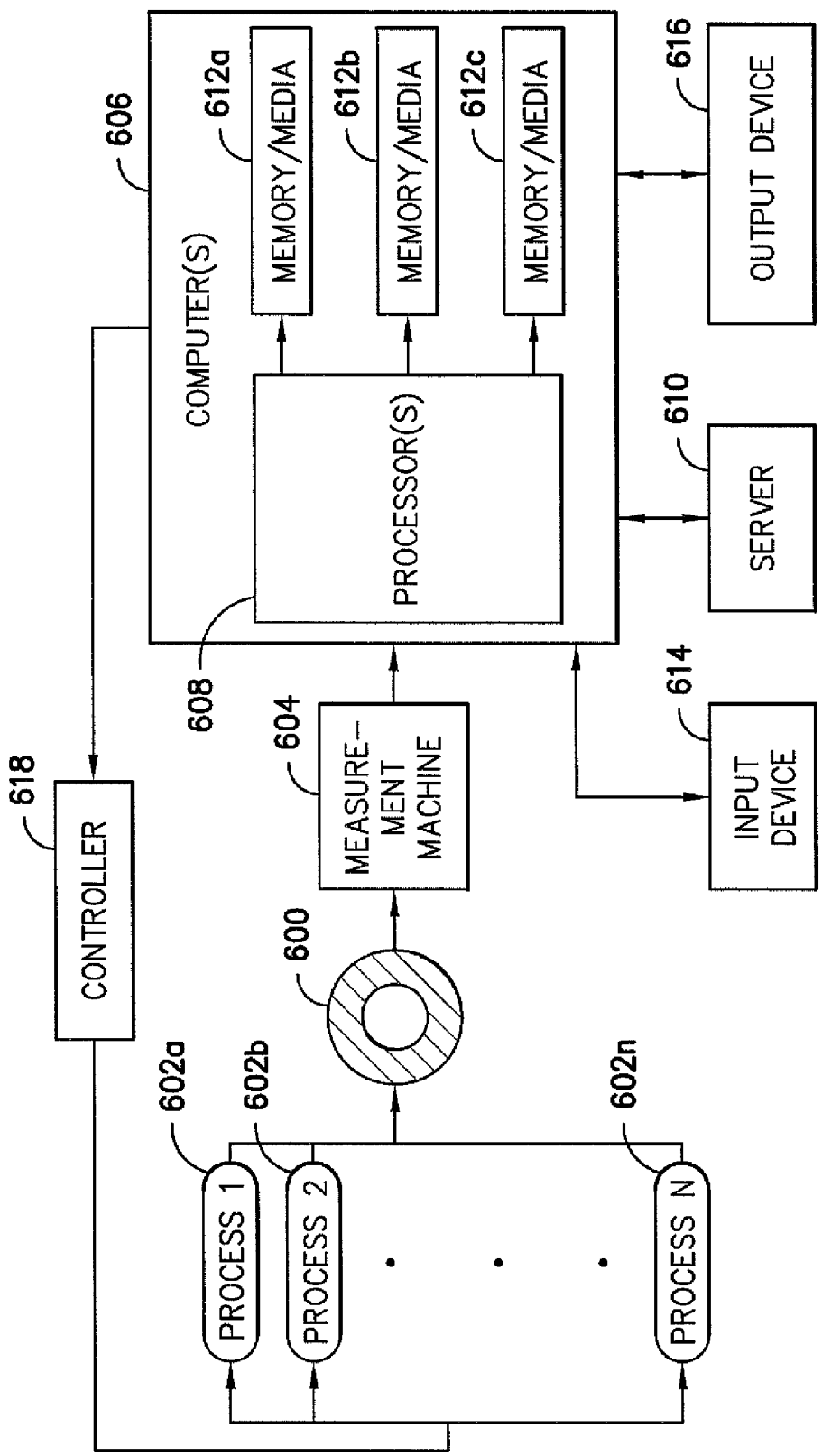
FIG. 8 provides a block diagram of an exemplary system according to an exemplary embodiment of the present disclosure.

Referring now to FIG. 8, a schematic overview of exemplary hardware components for implementing the above-described method is illustrated. An exemplary tire 600 is constructed in accordance with a plurality of respective manufacturing processes. Such tire building processes may, for example, include applying various layers of rubber compound and/or other suitable materials to form the tire carcass, providing a tire belt portion and a tread portion to form the tire summit block, positioning a green tire in a curing press, and curing the finished green tire, etc. Such respective process elements are represented as 602a, 602b, . . . , 602n in FIG. 8 and combine to form exemplary tire 600. It should be appreciated that a batch of multiple tires can be constructed from one iteration of the various processes 602a through 602n. Often, it is such a batch of multiple tires that are measured and tested in accordance with the disclosed uniformity improvement techniques. The multiple model tires can then be analyzed to improve the tire building process for subsequently manufactured tires.

Referring still to FIG. 8, a measurement machine 604 is provided to obtain the various uniformity measurements, such as the uniformity measurements obtained at (202) of FIG. 6. In general, such a measurement machine can include such features as a mounting fixture on which a tire is mounted and rotated centrifugally at one or more predetermined speeds. In one example, laser sensors are employed to operate by contact, non-contact or near contact positioning relative to tire 600 in order to determine the relative position of the tire surface at multiple data points (e.g., 128 points) as it rotates about a center line.

The measurements obtained by measurement machine 604 can be relayed such that they are received at one or more computers 606, which may respectively contain one or more processors 608, although only one computer and processor are shown in FIG. 8 for ease and clarity of illustration. Processor(s) 608 may be configured to receive input data from input device 614 or data that is stored in memory 612, including raw measurements of tire parameters. Processor(s) 608, can then analyze such measurements in accordance with the disclosed methods, and provide useable output such as data to a user via output device 616 or signals to a process controller 618. Uniformity analysis may alternatively be implemented by one or more servers 610 or across multiple computing and processing devices.

Various memory/media elements 612a, 612b, 612c (collectively, "612") may be provided as a single or multiple portions of one or more varieties of non-transitory computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. The computing/processing devices of FIG. 8 may be adapted to function as a special-purpose machine providing desired functionality by accessing software instructions rendered in a computer-readable form stored in one or more of the memory/media elements. When software is used, any suitable programming, scripting, or other type of language or combinations of languages may be used to implement the teachings contained herein.

Example 1

To better appreciate the advantages of separating the product joint effects from continuous effects according to the disclosed embodiments of the present disclosure, the results of an exemplary application of the disclosed techniques will now be presented. In particular, radial force variation (RFV) waveforms for 59 tires were measured and analyzed to parse the waveforms into joint components and into continuous components associated with the first 10 harmonics for each tire. The relative location of each of the joints was known and was assigned a twelve point joint interval. Joint characteristics of the product joints including joint height and contribution to radial force variation at the first harmonic were determined from the joint components of the RFV waveforms.

Figure 9:
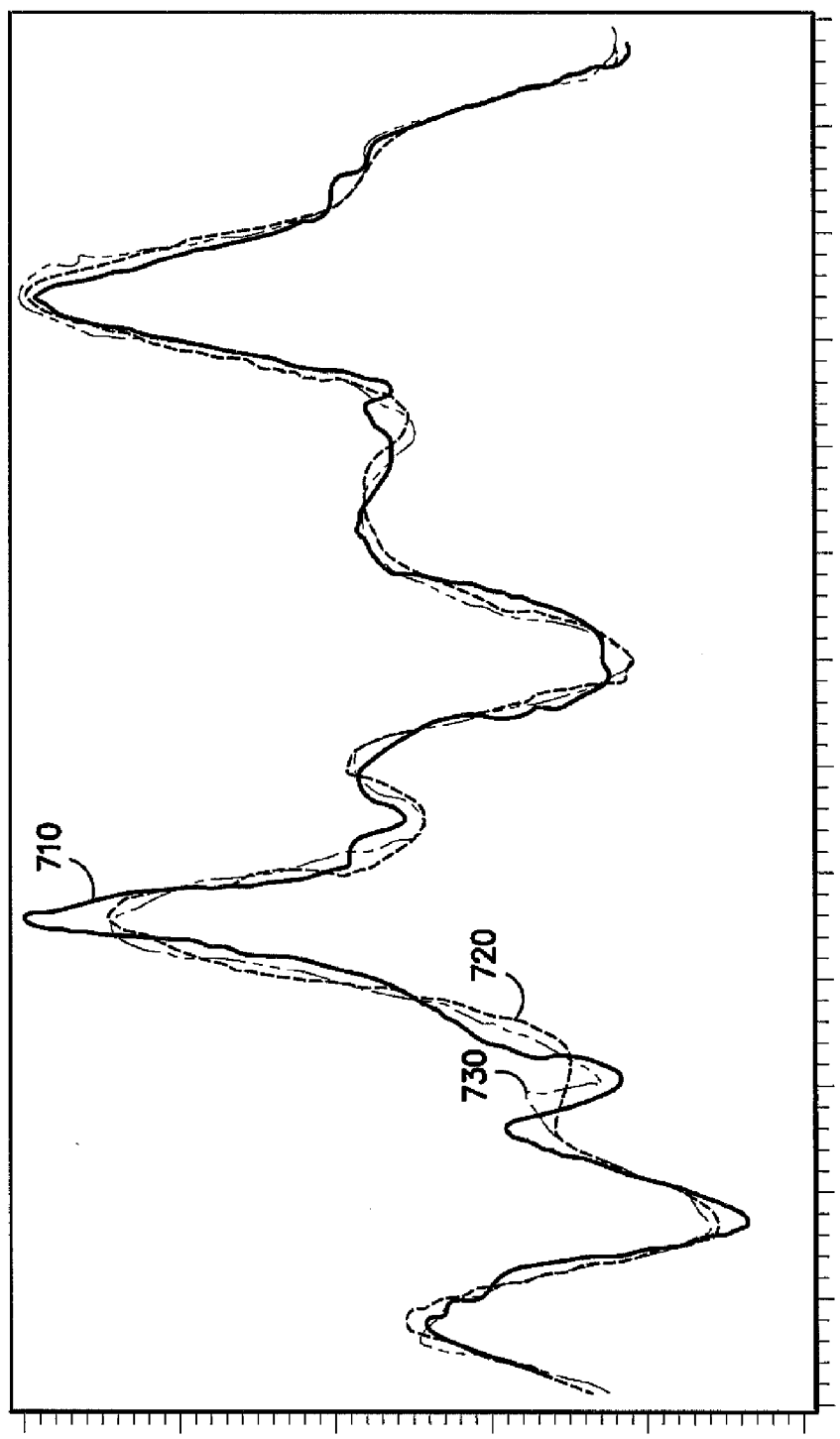
FIG. 9 depicts exemplary results of a regression analysis for an exemplary tire.

FIG. 9 depicts results of the regression analysis for an exemplary tire. Curve 710 depicts the raw RFV waveform for the tire. Curve 720 depicts an RFV curve modeled using regression analysis without separating joint effects from continuous effects. Curve 730 depicts an exemplary radial RFV waveform modeled using regression analysis that does separate joint effects from continuous effects. As illustrated, curve 730 provides a closer approximation to the raw data waveform 710.

Figure 10:
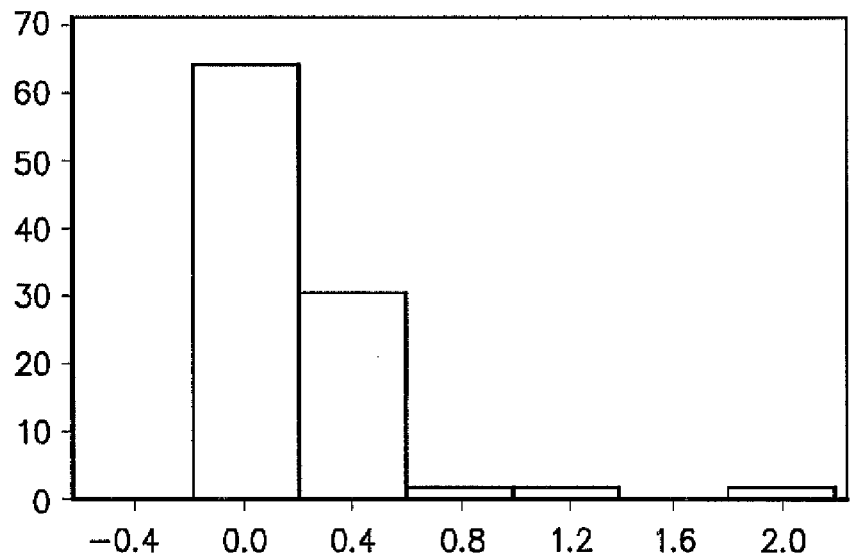
FIG. 10 depicts a histogram of joint heights identified according to an exemplary embodiment of the present disclosure.
Figure 11:
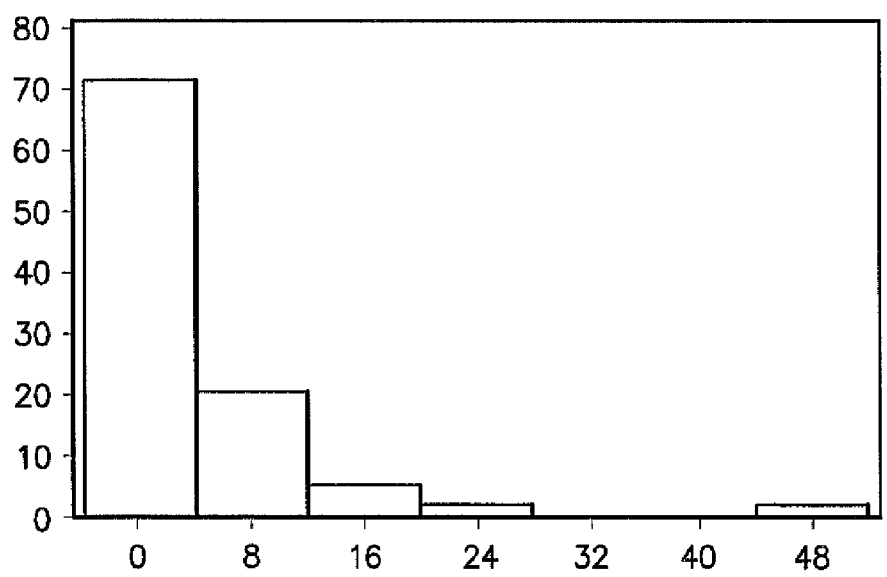
FIG. 11 depicts a histogram of contribution to radial force variation at the first harmonic identified according to an exemplary embodiment of the present disclosure.

FIG. 10 depicts a histogram of determined joint heights for the 59 tires. As shown, over 60% of the product joints had nominal joint heights of about 0.0. About 30% of the product joints had joint heights of about 0.4. A small percentage of the product joints had joint heights above 0.4. FIG. 11 depicts a histogram of the percentage of joint contribution to radial force variation at the first harmonic. As shown, about 70% of the product joints provided nominal contribution to radial force variation at the first harmonic. About 20% of the product joints provided between about 4% and about 12% of the radial force variation at the first harmonic. A small percentage of the product joints has contributions over about 12% of the radial force variation at the first harmonic. As demonstrated by FIG. 11, separation of uniformity waveforms into joint effects and continuous effects allows for identification of joint characteristics that may not have been determined using conventional uniformity analysis techniques.

Example #2—Vector Analysis

Figure 12:
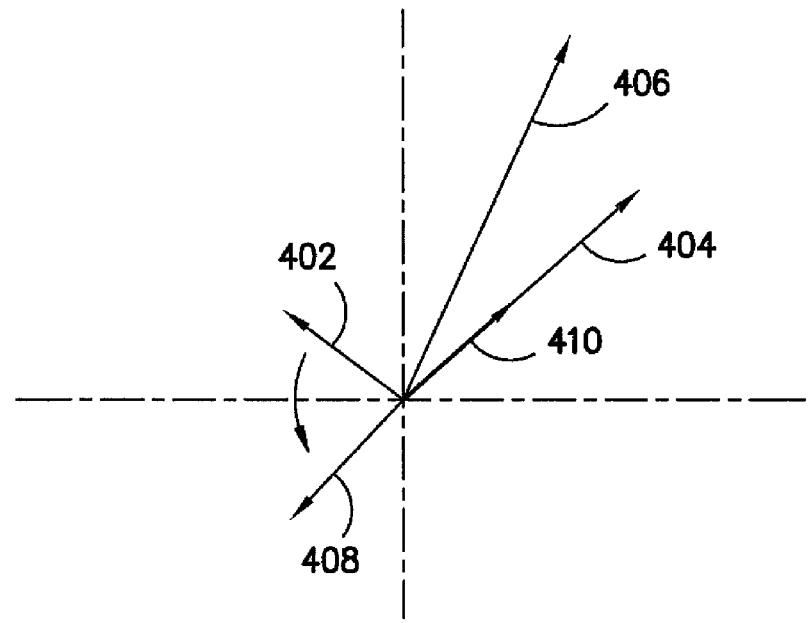
FIG. 12 provides a vector representation of an exemplary uniformity compensation method achieved by rotating products during tire manufacture. The vector analysis depicted in FIG. 12 does not separate joint effects from continuous effects.

To further illustrate the advantages of separating joint effects from continuous effects, an example vector analysis that can be used as part of a signature analysis for reducing radial force variation (RFV) at a first harmonic will now be set forth. FIG. 12 depicts a graphical depiction of an exemplary vector analysis that does not separate joint effects from continuous effects. Vector 402 represents the contribution in terms of both magnitude and phase of a first product or tooling effect to radial force variation at the first harmonic and vector 404 represents the contribution in terms of both magnitude and phase to radial force variation at the first harmonic for a second product or tooling effect. The vector 402 can have a magnitude of about 1 kg and the vector 404 can have a magnitude of about 2 kg. The vector 402 and vector 404 can be combined to provide the unrotated resultant vector 406, which represents the combined effect on radial force variation for both the first and second product at the first harmonic for the tire.

To improve the uniformity characteristics of the tire, the first product can be rotated on the building drum to achieve the rotated vector 408. The rotated vector 408 can then be combined with vector 404 to achieve the resultant vector 410. The resultant vector 410 can have a magnitude of about 1 kg. As graphically depicted in FIG. 12, the resultant vector 410 has significantly less magnitude than the unrotated resultant vector 406, indicating an improvement in the uniformity of the tire.

The signature analysis depicted in FIG. 12 treats both the joint and continuous effects associated with a product as a single vector. If the product has a continuous effect separate from a joint effect, then the joint effect and the continuous effect contributions at a selected harmonic are always associated with the same phase angle. This implies that the rotation to best compensate the tire for one sequence may not necessarily be the best for a subsequent tire in the sequence because a continuous effect may have moved to a new location with respect to the product joint.

According to aspects of the present disclosure, two signatures can be identified for each product, one for the product joint and the other for continuous effect. These two effects are independently rotatable with respect to each other, leading to more rotatable components—in fact double the number of components—for each product, leading to an increased ability to improve uniformity yields. This is graphically depicted in FIG. 13 which splits the effects associated with a product into both a continuous effect and a joint effect. In particular, vector 502 represents the contribution in terms of both magnitude and phase of a first product to radial force variation at the first harmonic and vector 504 represents the contribution in terms of both magnitude and phase to radial force variation at the first harmonic for a second product. The vector 502 can have a magnitude of about 1 kg and the vector 504 can have a magnitude of about 2 kg. The vector 502 and vector 504 can be combined to provide the unrotated resultant vector 506, which represents the combined effect on radial force variation at the first harmonic of the tire.

To improve the uniformity characteristics of the tire, the first product can be rotated to achieve the rotated vector 508. In addition, the second effect can be split into a joint component vector 510 and a continuous component vector 512. The joint component vector 510 can have a magnitude of about 0.2 kg and the continuous component vector 512 can have a magnitude of about 1.9 kg. The joint component vector 510 can be rotated relative to the continuous component vector 512 to compensate for the uniformity of the tire as shown at rotated joint vector 514. In one example, the joint component 510 can be rotated relative to the continuous component for the product by adjusting the relative location of the joint in the product. For instance, a small section of the product can be removed as it first comes off of an extruder so that the product joints are produced at different locations in the product.

The rotated vector 508, the rotated joint vector 514, and the vector 512 associated with the continuous effect of the second product can be combined to achieve the rotated resultant vector 516. The rotated resultant vector can have a magnitude of about 0.6 kg, a 40% improvement in radial force variation at the first harmonic.

Figure 13:
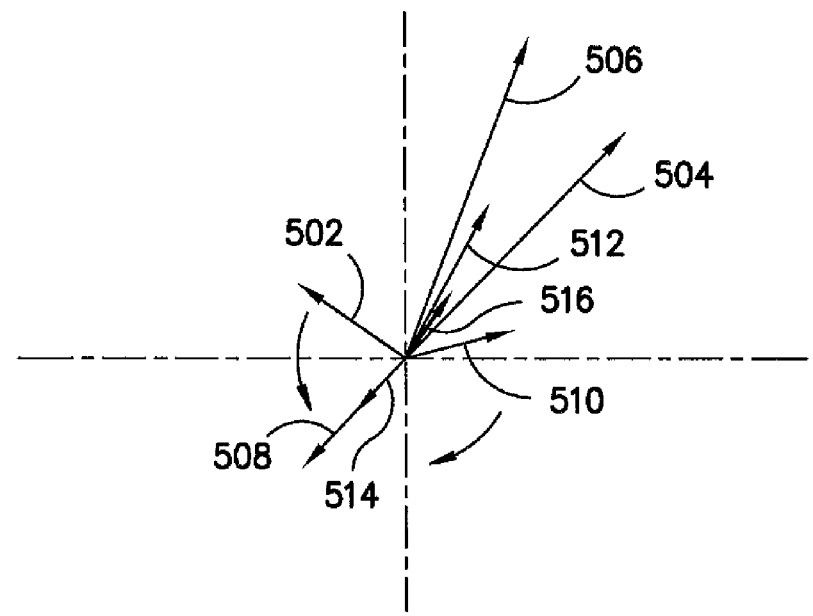
FIG. 13 provides a vector representation of an exemplary uniformity compensation method achieved by rotating products during tire manufacture. The vector analysis depicted in FIG. 13 does separate joint effects from continuous effects according to exemplary embodiments of the present disclosure.

As illustrated in FIG. 13, the rotated resultant vector 516 provides significant improvement over the unrotated resultant vector 506 and even over the rotated resultant vector 410 of FIG. 12. In this manner, the separation of the joint effects from the continuous effect according to embodiments of the present disclosure can provide for significant improvement in uniformity compensation methods.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for improving the uniformity of tires, comprising:
   receiving, at a processing device, a uniformity waveform measured for a tire, the uniformity waveform associated with at least one uniformity parameter for the tire;
   parsing, with the processing device, the uniformity waveform into one or more continuous components and at least one joint component, the at least one joint component associated with a product joint in the tire;
   deriving, with the processing device, one or more characteristics of the product joint based at least in part on the at least one joint component; and;
   wherein the uniformity waveform is a before-cure uniformity waveform for the tire, wherein the method comprises:
   estimating an after-cure contribution of a product joint to tire uniformity based on the characteristics of the product join; and
   modifying manufacture of the tire to improve uniformity of the tire based on the estimated after-cure contribution of the product joint.

2. The method of claim 1, wherein the one or more characteristics of the product joint comprise a joint location, a joint height, a joint length, or a joint shape.

3. The method of claim 1, wherein the one or more characteristics of the product joint comprise a harmonic distribution of the at least one joint component.

4. The method of claim 1, wherein parsing the uniformity waveform comprises modeling the uniformity waveform as a sum of a plurality of sinusoid terms and at least one joint term, the plurality of sinusoid terms being associated with the one or more continuous components and the at least one joint term being associated with the joint component.

5. The method of claim 4, wherein parsing the uniformity waveform further comprises:
   estimating coefficients associated with the at least one joint term using a linear regression analysis or a linear programming analysis; and
   determining one or more characteristics of the product joint based at least in part on the estimated coefficients.

6. The method of claim 5, wherein the at least one joint term is defined over a joint interval associated with a location of the product joint on the tire.

7. The method of claim 6, wherein the at least one joint term is modeled as a plurality of points within the joint interval, wherein estimating coefficients associated with the at least one joint term comprises estimating a separate coefficient for each of the plurality of points within the joint interval.

8. The method of claim 6, wherein the at least one joint term is modeled as a square wave within the joint interval, wherein estimating coefficients associated with the at least one joint term comprises estimating a coefficient associated with each of the plurality of points within the joint interval, the coefficient for each of the plurality of points within the joint interval being equal to zero or to a constant.

9. The method of claim 6, wherein the at least one joint term is modeled as a constant across the joint interval, wherein estimating coefficients associated with the at least one joint term comprises estimating the constant across the joint interval.

* * * * *